(12) United States Patent
Kim et al.

(10) Patent No.: US 9,610,978 B2
(45) Date of Patent: Apr. 4, 2017

(54) METHOD OF ASSEMBLING SUB-FRAME AND FRONT SIDE END IN VEHICLE

(71) Applicants: Hyundai Motor Company, Seoul (KR); Kia Motors Corporation, Seoul (KR); SIN YEONG Co., Ltd., Yeongcheon (KR); SUNGWOO HITECH CO., LTD., Busan (KR); MS AUTOTECH CO., LTD., Gyeongju, GyeongBuk (KR)

(72) Inventors: Dae Seung Kim, Gwacheon-si (KR); Chang Wook Park, Suwon-si (KR); Heui Won Yang, Suwon-si (KR); Log Won Do, Suwon-si (KR); Sang Hoon Chae, Hwaseong-si (KR); Jang-Su Kim, Gyeongju-si (KR); Sang-Lae Lee, Ulsan (KR); Mun Yong Lee, Busan (KR); Daeho Yang, Hwaseong-si (KR); Sungyong Park, Suwon-si (KR); Dae Keun Kim, Suwon-si (KR)

(73) Assignees: HYUNDAI MOTOR COMPANY, Seoul (KR); KIA MOTOR COMPANY, Seoul (KR); SHIN YOUNG CO., LTD., Yeongcheon-si, Gyeongsangbuk-do (KR); SUNGWOO HITECH CO., LTD., Busan (KR); MS AUTOTECH CO., LTD., Gyeongju-si, Gyeongsangbuk-do (KR)

( * ) Notice: Subject to any disclaimer, the term of this patent is extended or adjusted under 35 U.S.C. 154(b) by 460 days.

(21) Appl. No.: 14/099,679

(22) Filed: Dec. 6, 2013

(65) Prior Publication Data

US 2014/0157603 A1 Jun. 12, 2014

(30) Foreign Application Priority Data

Dec. 10, 2012 (KR) .................. 10-2012-0143101

(51) Int. Cl.
*B62D 21/11* (2006.01)
*B62D 25/08* (2006.01)

(52) U.S. Cl.
CPC ............ *B62D 21/11* (2013.01); *B62D 25/082* (2013.01); *B60G 2204/15* (2013.01); *Y10T 29/49622* (2015.01)

(58) Field of Classification Search
CPC .. B62D 21/11; B62D 25/082; B60G 2204/15; B60G 2204/4404; Y10T 29/49622
See application file for complete search history.

(56) References Cited

U.S. PATENT DOCUMENTS 7,393,015 B1 * 7/2008 Gillespie ................ B62D 21/11
180/312
7,828,330 B2 * 11/2010 Tamura ................ B62D 25/088
280/124.109

(Continued)

FOREIGN PATENT DOCUMENTS

KR 20-1998-0050491 U 10/1998

*Primary Examiner* — Sarang Afzali
(74) *Attorney, Agent, or Firm* — McDermott Will & Emery LLP

(57) ABSTRACT

A method of assembling a sub-frame of a vehicle with the front side member of the vehicle includes integrally forming a supporting end of a mounting nut that protrudes in a radial direction in a center of an external circumference of the mounting nut, forming a through hole in a lower surface of the front side member, forming a seat as a groove in an internal surface of the through hole, inserting a lower end of the mounting nut into the through hole so that the supporting end is supported by a circumference of the through hole, settling a head of the mounting nut in the seat, and welding the supporting end and the head along the circumference of the through hole and a side of the seat to assemble the sub-frame to the front side member.

3 Claims, 7 Drawing Sheets

(56) References Cited

U.S. PATENT DOCUMENTS

2003/0025359 A1* 2/2003 Takahashi ............ B62D 21/155
                                                           296/203.02
2005/0102953 A1* 5/2005 Masunaga .................. B60J 1/17
                                                              52/633

* cited by examiner

METHOD OF ASSEMBLING SUB-FRAME AND FRONT SIDE END IN VEHICLE

CROSS-REFERENCE TO RELATED APPLICATION

This application claims priority to and the benefit of Korean Patent Application No. 10-2012-0143101 filed in the Korean Intellectual Property Office on Dec. 10, 2012, the entire contents of which are incorporated herein by reference.

BACKGROUND

Technical Field

The present disclosure relates to a method of assembling a front side end to a sub-frame of a vehicle. More particularly, the present disclosure relates to a method of assembling a front side end to a sub-frame of a vehicle by increasing a combined area between a mounting nut of a sub-frame and a side member to realize a firm supporting structure.

Background

In general, a front sub-frame, hereinafter, referred to as a sub-frame, of a vehicle mounts power train parts such as an engine and a transmission in a monocoque vehicle body structure.

FIG. 1 is a perspective view illustrating assembly between a conventional side member and a sub-frame.

Referring to FIG. 1, a sub-frame 101 is combined with a lower part of a front side member 103, hereinafter, referred to as a side member, on both sides of a vehicle body 100 through a mounting nut and a mounting bolt.

FIG. 2 is a perspective view of an assembly unit in a conventional method of assembling a side member with a sub-frame. FIG. 3 is a cross-sectional view of an assembly unit in a conventional method of assembling a side member with a sub-frame.

Referring to FIGS. 2 and 3, a mounting nut 110 for engaging the sub-frame 101 with the side member 103 is first assembled with a bracket 120 and is inserted through a through hole H formed in a lower surface of the side member 103 to be assembled.

The mounting nut 110 is assembled with the bracket 120 and the side member 103 by arc welding and is combined with the bracket 120 and the side member 103 by spot welding.

A degree of freedom of motion of the mounting nut 110 must be suppressed in order to be firmly combined with the sub-frame 101. The mounting nut 110 has a supporting structure in which a circular supporting end 111 and the bracket 120 are combined with the mounting nut 110 in the center of the mounting nut 110 and the head 113 of the mounting nut 110 and a periphery of the through hole H of the side member 103 are combined with each other so that the degree of freedom of motion of the mounting nut 110 is suppressed.

Finally, the degree of freedom of motion of the mounting unit 110 is suppressed by stiffness of the bracket 120 and the side member 103 combined with the mounting nut 110.

However, in the conventional art, the mounting nut 110 and the bracket 120 are assembled with the side member 103 by a point combination or a line combination so that there are limitations on increasing combination stiffness or input point stiffness.

The above information disclosed in this Background section is only for enhancement of understanding of the background of the disclosure.

SUMMARY

An exemplary embodiment of the present disclosure provides a method of assembling a front side member with a sub-frame capable of forming a firm supporting structure through ribs additionally applied to a die-cast molded side member in order to support the mounting nut and a seat and increasing a combined area between the mounting nut and the side member to improve noise, vibration, and harshness (NVH) and driving performance of a vehicle.

According to one or a plurality of exemplary embodiments of the present disclosure, a method of assembling a sub-frame of a vehicle and a front side member a vehicle, includes integrally forming a supporting end of a mounting nut on the sub-frame that protrudes in a radial direction in a center of an external circumference of the mounting nut, forming a through hole in a lower surface of the front side member, forming a seat as a groove in an internal surface of the through hole, inserting a lower end of the mounting nut into the through hole so that the supporting end is supported by a circumference of the through hole, settling a head of the mounting nut in the seat, and welding the supporting end and the head along the circumference of the through hole and a side of the seat, to assemble the sub-frame to the front side member.

In addition, the front side member comprises a plurality of integrally die-cast molding ribs configured to connect the lower surface in which the through hole is formed with the internal surface, and the seat comprises a semi-circular groove formed in the internal surface, configured to correspond to a central linear axis of the through hole.

In addition, the welding may be performed by arc welding.

In addition, the welding may be performed by line welding along an edge of a supporting end of the mounting nut and a circumference of the through hole, and along the head of the mounting nut and the side of the seat.

According to the exemplary embodiment of the present disclosure, through ribs additionally applied to the die-cast molded side member in order to support the mounting nut, a firm supporting structure of a supporting surface may be formed. Simultaneously, through the seat formed on the internal surface, a combination area between the mounting nut and the side member is increased so that NVH and driving performance of a vehicle may be improved.

In addition, the additional bracket may be removed to reduce the weight of the vehicle and thereby reduce cost.

DETAILED DESCRIPTION

Hereinafter, various exemplary embodiments of the present disclosure will be described in detail with reference to the accompanying drawings.

In order to clarify exemplary embodiments of the present disclosure, parts that are not related to description are omitted.

Figure 1:
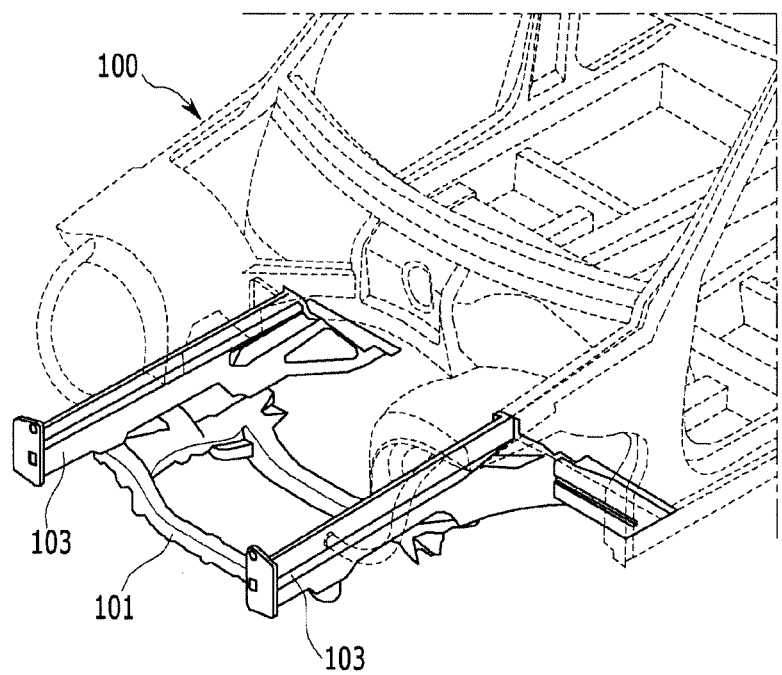
FIG. 1 is a perspective view describing an assembly state of a conventional front side member and a sub-frame.
Figure 2:
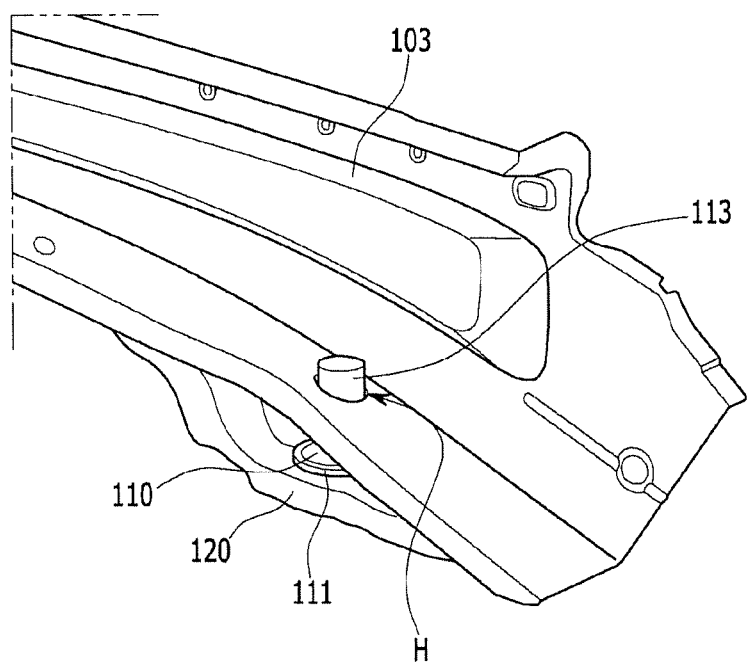
FIG. 2 is a perspective view of an assembly unit in a conventional method of assembling a mounting nut for a sub-frame.
Figure 3:
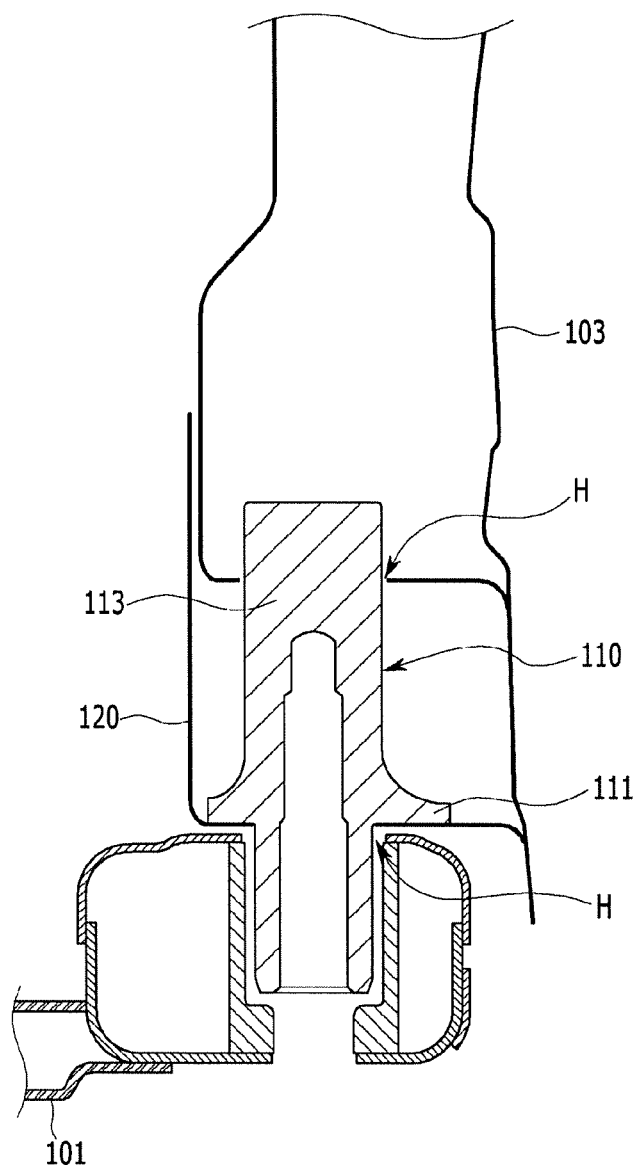
FIG. 3 is a cross-sectional view of an assembly unit in a conventional method of assembling a mounting nut for a sub-frame.
Figure 4:
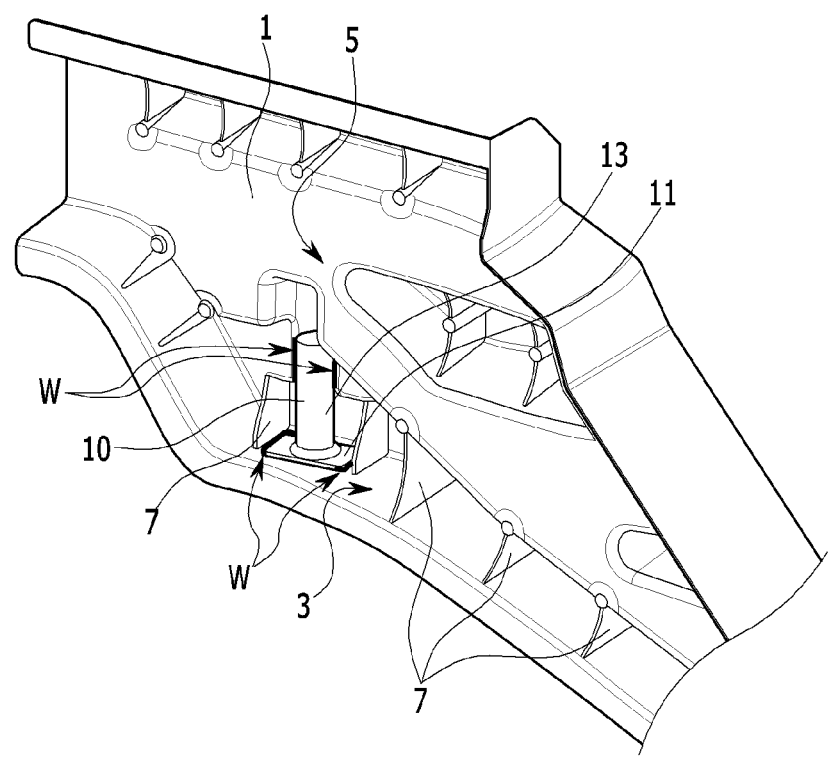
FIG. 4 is a perspective view of an assembly unit in a method of assembling a mounting nut for a sub-frame according to an exemplary embodiment of the present disclosure.
Figure 5:
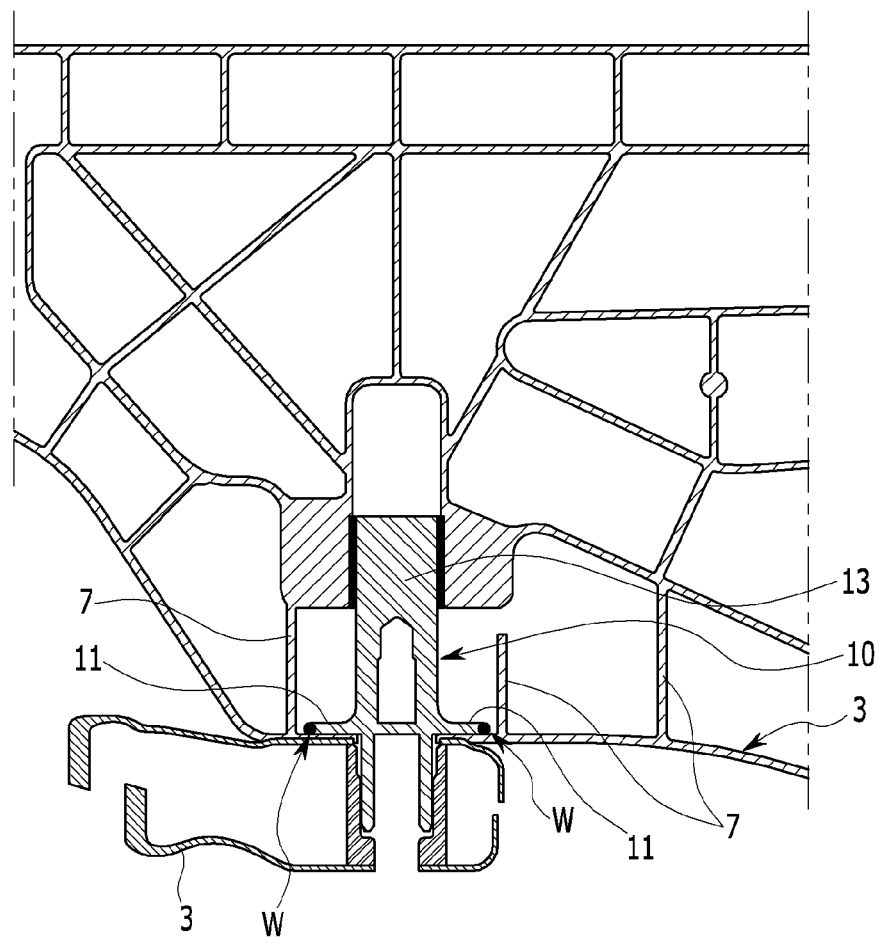
FIG. 5 is a side cross-sectional view of an assembly unit in a method of assembling a front side member and a sub-frame according to an exemplary embodiment of the present disclosure.
Figure 6:
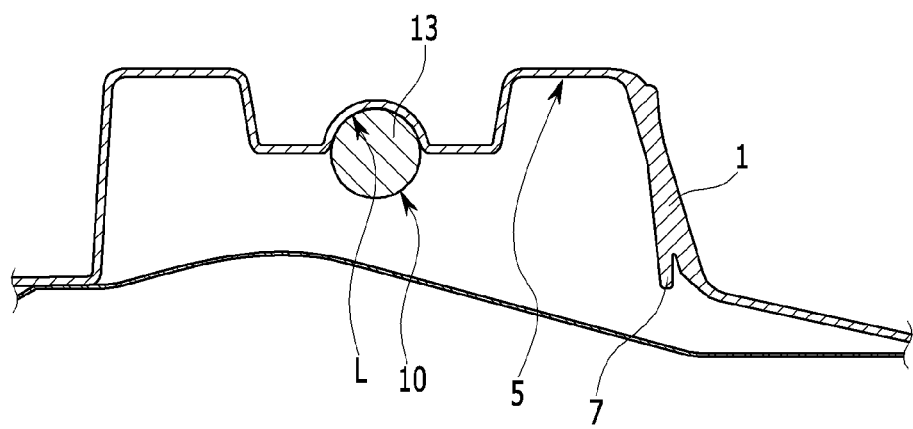
FIG. 6 is a plan cross-sectional view of an assembly unit in a method of assembling a front side member and a sub-frame according to an exemplary embodiment of the present disclosure.
Figure 7:
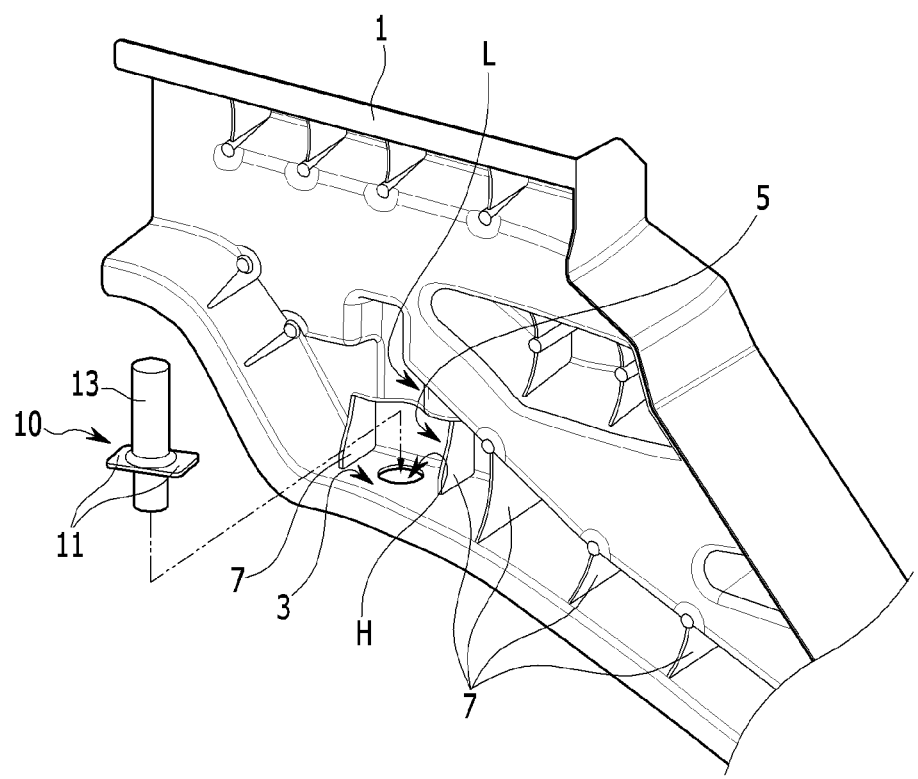
FIG. 7 is an exploded perspective view of an assembly unit in a method of assembling a front side member and a sub-frame according to an exemplary embodiment of the present disclosure.

FIG. 4 is a perspective view of an assembly unit in a method of assembling a front side member and a sub-frame according to an exemplary embodiment of the present disclosure. FIG. 5 is a side cross-sectional view of an assembly unit in a method of assembling a front side member and a sub-frame according to an exemplary embodiment of the present disclosure. FIG. 6 is a plan cross-sectional view of an assembly unit in a method of assembling a front side member and a sub-frame according to an exemplary embodiment of the present disclosure. FIG. 7 is an exploded perspective view of an assembly unit in a method of assembling a front side member and a sub-frame according to an exemplary embodiment of the present disclosure.

Referring to FIGS. 4 to 7, in a method of assembling a sub-frame of a vehicle to a front side member of a vehicle according to an exemplary embodiment of the present disclosure, a mounting nut 10 assembled on a sub-frame 3 of a vehicle is firmly engaged with the side member 1.

For example, first, a supporting end 11 of a mounting nut 10 is integrally formed in a center of an external circumference of the mounting nut 10 to protrude on both sides of the mounting nut 10 in a radial direction.

Then, as illustrated in FIG. 7, a through hole H may be formed in a lower surface of the side member 1. A seat L as a groove may be formed in an internal surface corresponding to the through hole H.

For example, the seat L may be a semi-circular groove and have a predetermined height.

In some examples, the side member 1, a plurality of ribs 7 for connecting a lower surface 3 in which the through hole H is formed and an internal surface 5 are formed, and the seat L comprising a semi-circular groove may be formed on the internal surface to correspond to a central linear axis of the through hole H.

The ribs 7 and the seat L may be integrally molded when the side member 1 is die-cast molded.

In assembling the sub-frame 3 and the front side member 1 with each other, first, a lower end of the mounting nut 10 may be inserted into the through hole H so that the supporting end 11 is installed on a circumference of the through hole H to be supported.

Then, a head 13 of the mounting nut 10 may be settled in the seat L. For example, to stably support the head 13, at least half of the head 13 may be settled in the seat L.

After the head 13 is settled in the seat L, the supporting end 11 of the mounting nut 10 may be welded to the circumference of the through hole H. In addition, the head 13 of the mounting nut 10 may be welded along the side of the seat L along the axial direction of the mounting nut 10.

For example, as shown in FIGS. 4 and 5, the welding may be performed along an edge of the supporting end 11 of the mounting nut 10 and the circumference of the through hole H by line welding and along the head 13 of the mounting nut 10 and the side of the seat L by line welding.

Here, the welding may be performed by arc welding. However, the present disclosure is not limited to the above and any welding method suitable for a characteristic of a welding base metal in which line welding may be performed may be used.

Therefore, according to the above-described method, a firm supporting structure of the lower surface 3 that is a supporting surface may be formed by the plurality of ribs 7 additionally applied to the die-cast molded side member 1 in order to support the mounting nut 10.

In addition, through the semi-circular seat L formed on the internal surface of the side member 1, a combined area between the head 13 of the mounting nut 10 and the side member 1 is increased and a line combination by welding is performed so that combination stiffness is increased. Therefore, NVH and driving performance of a vehicle may be improved.

That is, the mounting nut 10 is directly inserted into the side member 1 to be assembled so that a process may be simplified and cost may be reduced. The conventional additional bracket may be removed to reduce weight and cost of the vehicle.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of assembling a sub-frame of a vehicle with a front side member of the vehicle, comprising:
    integrally forming a supporting end of a mounting nut that protrudes in a radial direction in a center of an external circumference of the mounting nut,
    forming a through hole in a lower surface of the front side member,
    forming a seat as a semi-circular groove in an internal surface of a sub-frame,
    inserting a lower end of the mounting nut into the through hole so that the supporting end is supported by a circumference of the through hole,
    settling a head of the inserted mounting nut in the seat, and
    welding the supporting end along the circumference of the through hole and the head along a side of the seat to assemble the sub-frame to the front side member,
    wherein the front side member comprises a plurality of integrally die-cast molding ribs configured to connect the lower surface in which the through hole is formed with the internal surface, and
    the semi-circular groove having a central axis coaxial with a linear axis of the through hole.

2. The method of claim 1, wherein the welding is performed by arc welding.

3. The method of claim 1, wherein the welding is performed by line welding along an edge of the supporting end of the mounting nut and the circumference of the through hole, and along the head of the mounting nut and the side of the seat.

* * * * *